(12) United States Patent
Krämer et al.

(10) Patent No.: US 10,037,827 B2
(45) Date of Patent: Jul. 31, 2018

(54) METHOD AND DEVICE FOR REPAIRING DAMAGE TO A CONTAINER WALL LOCATED UNDER WATER

(71) Applicant: AREVA GmbH, Erlangen (DE)

(72) Inventors: Georg Krämer, Wiesenttal (DE); Konrad Meier-Hynek, Herzogenaurach (DE); Bernd Bischoff, Hemhofen (DE); Martin Neumeister, Nürnberg (DE)

(73) Assignee: AREVA GMBH, Erlangen (DE)

( * ) Notice: Subject to any disclaimer, the term of this patent is extended or adjusted under 35 U.S.C. 154(b) by 347 days.

(21) Appl. No.: 14/906,430

(22) PCT Filed: Jul. 25, 2014

(86) PCT No.: PCT/EP2014/066048
§ 371 (c)(1),
(2) Date: Jan. 20, 2016

(87) PCT Pub. No.: WO2015/011270
PCT Pub. Date: Jan. 29, 2015

(65) Prior Publication Data
US 2016/0155523 A1    Jun. 2, 2016

(30) Foreign Application Priority Data

Jul. 26, 2013   (DE) .................. 10 2013 108 008
Jul. 26, 2013   (DE) .................. 10 2013 108 010

(51) Int. Cl.
*G21C 19/20*    (2006.01)
*G21C 19/07*    (2006.01)
*E04G 23/02*    (2006.01)

(52) U.S. Cl.
CPC ........... *G21C 19/207* (2013.01); *G21C 19/07* (2013.01); *E04G 23/02* (2013.01)

(58) Field of Classification Search
CPC ....... G21Y 2002/101; G21Y 2002/104; G21Y 2002/302; G21Y 2002/40;
(Continued)

(56) References Cited

U.S. PATENT DOCUMENTS 2,524,419 A * 10/1950 Billner ............... B28B 7/46
                                                          264/102
4,436,694 A *  3/1984 Vassalotti ........... G21F 9/001
                                                          376/249
(Continued)

FOREIGN PATENT DOCUMENTS

DE    84 34 397 U1    2/1985
DE    39 13 202 A1    10/1990
(Continued)

OTHER PUBLICATIONS

International Application No. PCT/EP2014/066048 International Preliminary Report on Patentability dated Feb. 4, 2016 (3 Pages).
(Continued)

*Primary Examiner* — Jason L Vaughan
(74) *Attorney, Agent, or Firm* — Keller Jolley Preece

(57) ABSTRACT

The invention relates to a method and a device for repairing damage to a container wall located under water. A repair device has a carrier having means for fastening the carrier to the container wall, a repair die that has at least one injection opening and at least one outlet opening and can be pressed against the container wall in a remotely controlled manner in order to cover the damage to the container wall and to seal off a chamber formed by the repair die and the container wall, a reservoir for an adhesive, a remotely controllable injection device is arranged on the carrier, which remotely controllable injection device is provided in order to inject adhesive from the reservoir into the injection opening of the
(Continued)

repair die so that the chamber formed by the repair die and the container wall is filled by means of the adhesive.

16 Claims, 13 Drawing Sheets

(58) Field of Classification Search
CPC .......... G21Y 2002/402; G21Y 2004/50; Y10T 29/49732; Y10T 29/49746; Y10T 29/531; B29C 73/02; B29C 73/025; B29C 73/10; B29C 73/12; B29C 73/24; B29C 73/245; B29C 73/26; B29C 73/262; B29C 73/264; B29C 73/266; B29C 73/268
USPC .......... 976/DIG. 210, DIG. 212; 29/906, 723; 425/13
See application file for complete search history.

(56) References Cited

U.S. PATENT DOCUMENTS

| | | | | |
|---|---|---|---|---|
| 4,716,010 A | * | 12/1987 | Gallo | B23P 19/02 29/407.09 |
| RE33,373 E | * | 10/1990 | Gallo | B23P 19/00 29/525 |
| 5,063,006 A | * | 11/1991 | Tahara | E04G 23/0211 264/35 |
| 5,193,405 A | * | 3/1993 | Oomichi | B25J 5/00 73/865.8 |
| 5,465,881 A | * | 11/1995 | Zwicky | B63C 11/52 222/389 |
| 5,519,741 A | * | 5/1996 | Suzuki | G21C 17/01 376/205 |
| 5,864,595 A | * | 1/1999 | Burrows | G21C 17/01 376/249 |
| 5,878,099 A | * | 3/1999 | Burrows | G21C 17/003 376/249 |
| 6,064,708 A | * | 5/2000 | Sakamaki | B63C 11/44 114/222 |
| 6,715,201 B2 | * | 4/2004 | Sato | G21C 19/02 29/402.01 |
| 7,252,727 B2 | * | 8/2007 | DeTurris | B29C 73/02 114/343 |
| 8,371,025 B2 | * | 2/2013 | Kramer | E04G 23/0218 29/402.09 |
| 9,058,905 B2 | * | 6/2015 | Olsen | G21C 17/013 |
| 9,666,314 B2 | * | 5/2017 | Kramer | G21C 19/02 |
| 9,779,842 B2 | * | 10/2017 | Strohmayer | G21C 19/07 |
| 2009/0102096 A1 | | 4/2009 | Hansen et al. | |
| 2010/0192368 A1 | | 8/2010 | Krämer et al. | |
| 2013/0145594 A1 | | 6/2013 | Krämer et al. | |

FOREIGN PATENT DOCUMENTS

| | | |
|---|---|---|
| DE | 39 16 186 A1 | 11/1990 |
| DE | 10 2008 014 544 A1 | 9/2009 |
| DE | 10 2012 205 013 A1 | 6/2013 |
| EP | 0 461 506 A1 | 12/1991 |
| EP | 1 462 787 A1 | 9/2004 |
| EP | 1 482 518 A2 | 12/2004 |
| JP | 2008-216201 A | 9/2008 |
| JP | 2012-194118 A | 10/2012 |
| JP | 2012-242158 A | 12/2012 |

OTHER PUBLICATIONS

Nygren, Hanna, "Further development of moulding technology for underwater applications in nuclear rectors", UPTEC F10 018, Thesis 30 credits, Mar. 2010, pp. 1-53.

* cited by examiner 10,037,827 B2

METHOD AND DEVICE FOR REPAIRING DAMAGE TO A CONTAINER WALL LOCATED UNDER WATER

CROSS-REFERENCE TO RELATED APPLICATIONS

This application is a national phase entry under 35 U.S.C. § 371 of International Application No. PCT/EP2014/066048, filed Jul. 25, 2014, which claims the benefit of German Application No. 10 2013 108 008.1, filed Jul. 26, 2013 and German Application No. 10 2013 108 010.3, filed Jul. 26, 2013. The entire contents of each of the foregoing patent applications are hereby incorporated by reference.

BACKGROUND OF THE INVENTION

1. Field of the Invention

The invention relates to a method and a device for repairing damage to a container wall located under water.

2. Background and Relevant Art

Container walls, for example of fuel element storage pools in a nuclear power plant, may exhibit damage or damaged areas, in particular at weld seams. Damage at weld seams is often caused by chlorine-induced stress crack corrosion, since they are susceptible to this on account of their construction and general conditions. Moreover, for safety reasons, particularly in fuel element storage pools, the water must not be drained off, as a result of which a damaged area of the container has to be repaired under water. To repair the damage, an adhesive material is used that has to be affixed to the damaged area.

To repair the damage, an adhesive material is used that has to be applied to the damaged area by means of a repair device. If the damaged area and also the surrounding area are inaccessible to humans for reasons of radiation protection, positioning of the repair device is made difficult in particular.

BRIEF SUMMARY OF THE INVENTION

The object of the present invention is therefore to make available an improved method and an improved device for repairing damage to a container wall located under water.

With respect to the device, this object is achieved by a repair device having the features of claim 1. With respect to the method, the object is achieved by a method for repairing damage to a container wall located under water according to the features of claim 9.

Advantageous embodiments of the invention are the subject matter of the dependent claims.

Accordingly, the repair device of the invention comprises a carrier which has means for securing it to the container wall.

A repair die is arranged on the carrier, which repair die has at least one injection opening and at least one outlet opening and can be pressed against the container wall by means of remotele control in order to cover the damage to the container wall, i.e. the damaged area of the container wall, and to seal off a space formed by the repair die and the container wall. A container wall is to be understood as any wall of a container, for example side walls, or partition walls located in a container, or also the bottom or top cover of a container.

Moreover, at least one reservoir for an adhesive is arranged on the carrier, and a remotely controllable injection device is also arranged on the carrier, which remotely controllable injection device is provided in order to inject adhesive from the reservoir into the injection opening of the repair die, such that the space formed by the repair die and the container wall is filled by means of the adhesive. The repair die thus forms a kind of outer mold for the adhesive that is to be affixed.

With a repair device of this kind, it is thus possible even for an area of a container wall located under water to be repaired by means of an adhesive in a remotely controlled manner. For this purpose, the repair device is secured with the aid of the securing means arranged on the carrier, which securing means preferably comprises suction pads.

Next, the repair die is pressed onto the container wall in such a way that the damaged area is covered by the repair die. Container wall and repair die then form a closed-off space into which adhesive is subsequently injected through the injection opening present in the repair die, by means of the injection device likewise arranged on the carrier. The space formed by the repair die and container wall is thus filled with adhesive. The reservoir for the adhesive thus contains at least a quantity of adhesive sufficient to fill the entire space with adhesive. Accordingly, the reservoir has to be dimensioned at least such that its volume is at least as great as, preferably greater than, the space formed by container wall and repair die.

In a preferred embodiment of the invention, the repair device has a coupling adapted to connect the repair device to a positioning device. A positioning device can be any tool capable of positioning the repair device at the intended location, i.e. at the damaged area of the container wall.

Preferably, the positioning device is a submersible vehicle. A vehicle of this kind is, for example, known from EP 1462787 B1. With the submersible vehicle, the repair device according to the invention can be maneuvered in a remotely controlled manner through water located in the container and can thus be moved to a damaged area of the container wall.

In a simple case, a positioning device can also be formed by a linkage system or also by a cable pull. These means also allow for a positioning of the repair device to the desired location by the operating personnel from a safe distance. For better maneuverability of the repair device under water, the repair device itself can also be provided with one or more propulsion devices that permit a movement of the repair device under water.

Moreover, the positioning device can also be formed by a rail system and a carriage coupled to the repair device.

With the aid of a laser and one or more cameras that are adapted to the positioning device, the repair device according to the invention can be positioned exactly at the damaged area of the container wall. A target marker, like for example one or more points, a crosshair or also contour lines characteristic of the repair die, is projected onto the container wall by means of the laser. The target marker is then brought into coincidence with the damaged area.

After the repair device has been positioned at the damaged area and has been secured to the container wall by the securing means, it is possible, with the aid of the coupling, for the repair device to be uncoupled from the positioning device, for example from the positioning device of the submersible vehicle.

To prepare for the pending repair work, the repair device, in a preferred embodiment, has a cleaning device with which the damaged area to be repaired can be cleaned. Thereafter, as described above, the repair die is positioned at the damaged area.

In order to allow for a particularly efficient repair, the damaged area is repaired by means of a multi-component adhesive, for example a two-component adhesive. In order to mix the multi-component adhesive in situ, i.e. only during the use of the repair device at the damaged area, the reservoir has the required number of chambers for each of the components of the multi-component adhesive. When a two-component adhesive is used, the reservoir thus has two chambers.

Moreover, the carrier comprises a mixing device with which the individual components are mixed directly before being applied to the desired area. After the individual components have been mixed, the adhesive is then introduced through the at least one injection opening, preferably through several injection openings of the repair die, into the space formed between repair die and container wall. Through a further opening of the repair die, namely the outlet opening, water located between container wall and repair die can flow out of the space formed by these two elements and back into the container. As this space is thus gradually filled with the adhesive, the water is displaced by the adhesive and is able to leave the space through the outlet opening. After completion of the injection procedure, the injection and outlet openings are closed in order to separate the space from the inlet and outlet lines. The damage to the container wall is remedied by the space being filled with adhesive and by the adhesive then setting.

In order to ensure protection of the affixed adhesive, the repair device additionally comprises a cover plate. The latter can be inserted into the repair die in the preparatory phase in which, for example, the repair device is also equipped with adhesive. The cover plate also has at least one injection opening for injecting adhesive into the space between cover plate and container wall, and at least one outlet opening allowing water to escape from this space. After the repair procedure, the cover plate remains adhering to the adhesive, such that it protects the latter.

The method according to the invention for repairing damage to a container wall located under water utilizes the repair device as described herein before.

The method is improved in particular in terms of the positionability of the repair device for repairing the damage to a container wall located under water.

In an advantageous embodiment of the invention, the method comprises the following steps:

a) making available a crate in which a frame with a hoisting device is located, wherein a decontamination device and a transport vessel with the repair device are arranged within the frame, b) unloading the frame from the crate, c) placing the frame on the edge of the container, d) driving the decontamination device and the transport vessel out of the frame, such that the decontamination device and the transport vessel are located above the water level, e) lowering the transport vessel with the repair device into the container filled with water.

The method permits, on the one hand, easy transport of the repair device and, on the other hand, subsequent positioning even in an area inaccessible to humans.

All the components required to carry out the method are located in the crate. In addition to the components mentioned above, these can additionally include, for example, video technology, compressors, control elements and a vacuum station. The crate serves as a safe and compact storage location for all the means that are required to carry out the method.

To permit maneuverability of the repair device in particular under water, it is connected to a positioning device, in particular to the positioning device described above, which is likewise located in the transport vessel at the start of the method. A positioning device can be any tool with which the device may be positioned at the intended location, i.e. at the damaged area of the container wall.

Preferably, the positioning aid is the submersible vehicle known from EP 1462787 B1, for example.

With the positioning device or the submersible vehicle, the device according to the invention can be maneuvered in a remotely controlled manner through water located in the container and can thus be moved to a damaged area of the container wall.

If, in step a), the container is initially placed at a level which lies below the upper edge of the container wall, or if barriers, for example masonry, are located between the placement site and the container wall, the frame is placed at the edge of the container by means of a lifting device, preferably a crane, in step c). For this purpose, a suitable element, for example a lug, is located on the frame, in which lug a crane hook, for example, can engage such that the frame can be lifted along with the repair device. This crane hook can likewise be engaged and disengaged in a remotely controlled manner.

In a preferred embodiment of the invention, steps c) to e) are performed by remote control via a communication interface that is present on the crate. By way of this interface, the decontamination device and the transport vessel can then be driven out of the frame from a switching center, such that the decontamination device and the transport vessel are located above the water level and, finally, the transport vessel can be lowered into the water-filled container with the repair device and, if present, with the positioning device. It is therefore not necessary for a human to be present in direct proximity to the container during said steps. Instead, remote control is possible from the switching center, which can be arranged at a safe distance from the container. The switching center can be linked by means of cables to the communication interface of the crate, such that the individual control commands are transmitted via these cables to the communication interface and from there to the individual appliances such as frame, lifting device, decontamination device or repair device. To monitor the individual steps of the operation, video technology can be used, by means of which the progress of the operation can be viewed for example on monitors at the switching center.

However, the communication interface can preferably also be configured in such a way as to permit wireless connection to it from the switching center. The individual control commands are then transmitted by radio signals.

A surface of the damaged area of the container wall is preferably cleaned by means of the above-described cleaning device of the repair device before the adhesive is introduced.

For this purpose, the repair device can be secured to the container wall (4) by means of securing means, which are designed as the above-described suction pads.

Particularly preferably, the above-described repair die is thus arranged on the container wall in such a way that the damaged area is covered by the repair die and adhesive is introduced in the cavity between container wall and repair die.

For further explanation of the invention, reference is made to the illustrative embodiment shown in the figures, in which:

Elements corresponding to one another are provided with the same reference signs in all of the figures.

DETAILED DESCRIPTION

Figure 1:
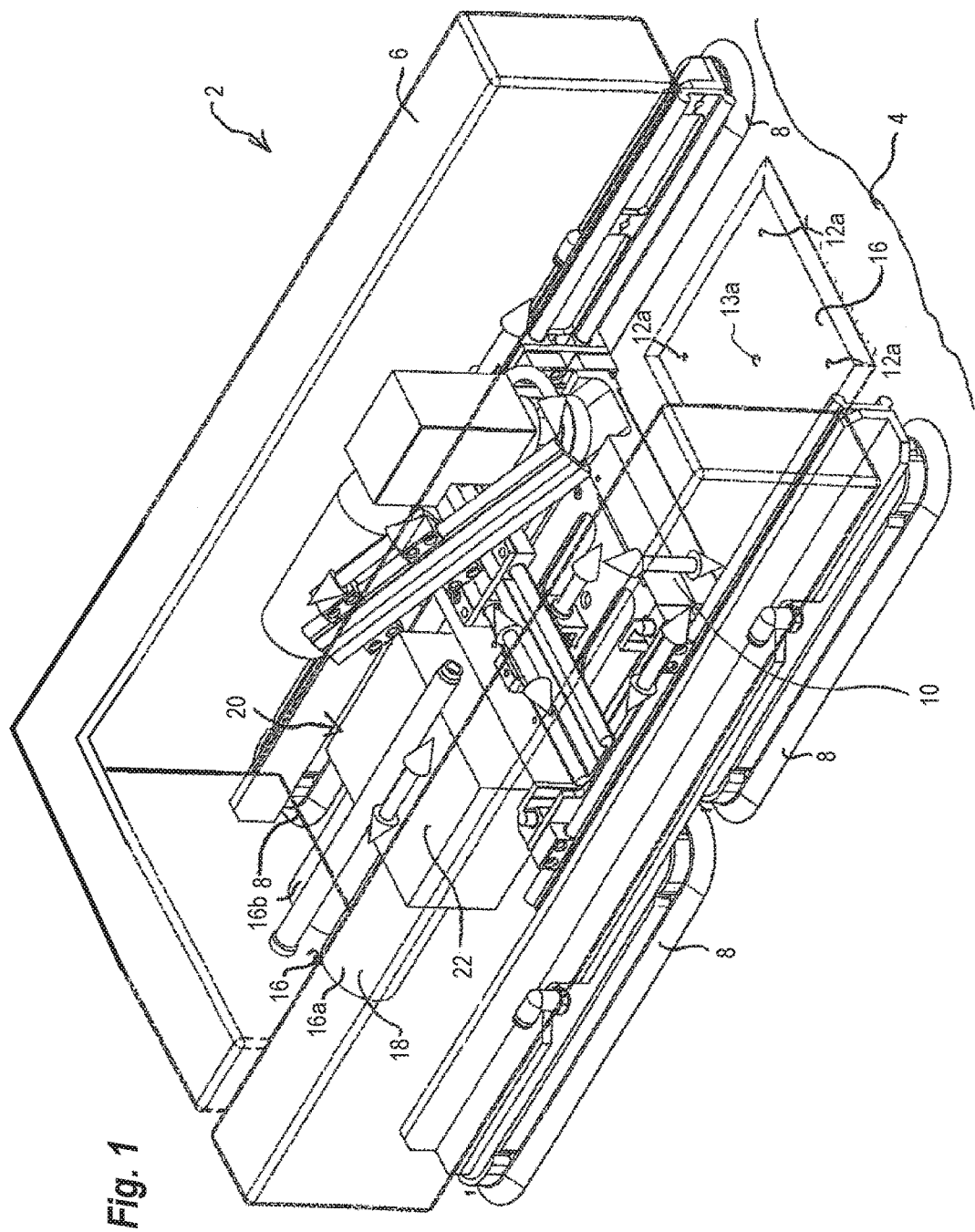
FIG. 1 shows a perspective view of the repair device according to the invention.
Figure 2:
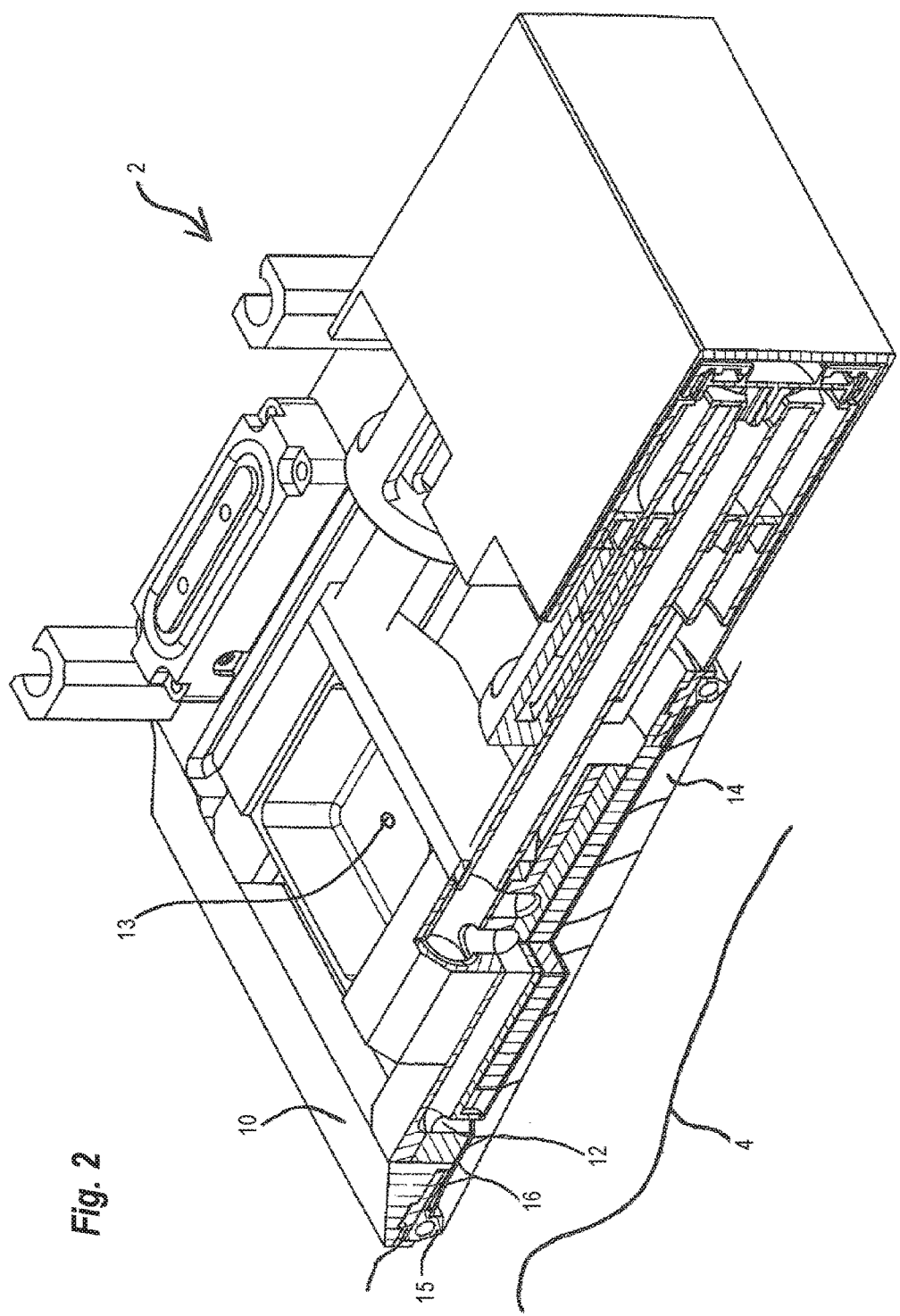
FIG. 2 shows a detail of part of the repair device in a sectional view.

FIG. 1 shows, and FIG. 2 shows in part, the repair device 2 according to the invention for repairing damage to a container wall 4 located under water. The repair device 2 has a carrier 6 on which means 8 are arranged for securing it to the container wall 4. In the illustrative embodiment, these means are provided by four suction pads.

A repair die 10 is moreover arranged on the carrier 6, which repair die 10 has at least one injection opening, in this illustrative embodiment four injection openings 12, and an outlet opening and can be pressed in a remotely controlled manner against the container wall 4 in order to cover the damaged area of the container wall 4 and to seal off a space 14 formed by repair die 10 and container wall 4. The sealing takes place here with a preferably flexible seal 15. The repair die 10 in this case has a square surface area and is shaped in such a way that a hollow space 14 is formed between the container wall 4 and the repair die 10. This space 14 is thus delimited about its full periphery by the container wall 4 and the repair die 10 and closed off. Between repair die 10 and container wall 4 there is preferably a flexible seal 15, which ensures that no water can escape from the space 14 between repair die 10 and container wall 4. Only the injection openings 12 and the outlet opening 13 permit access to this space 14.

Figure 3:
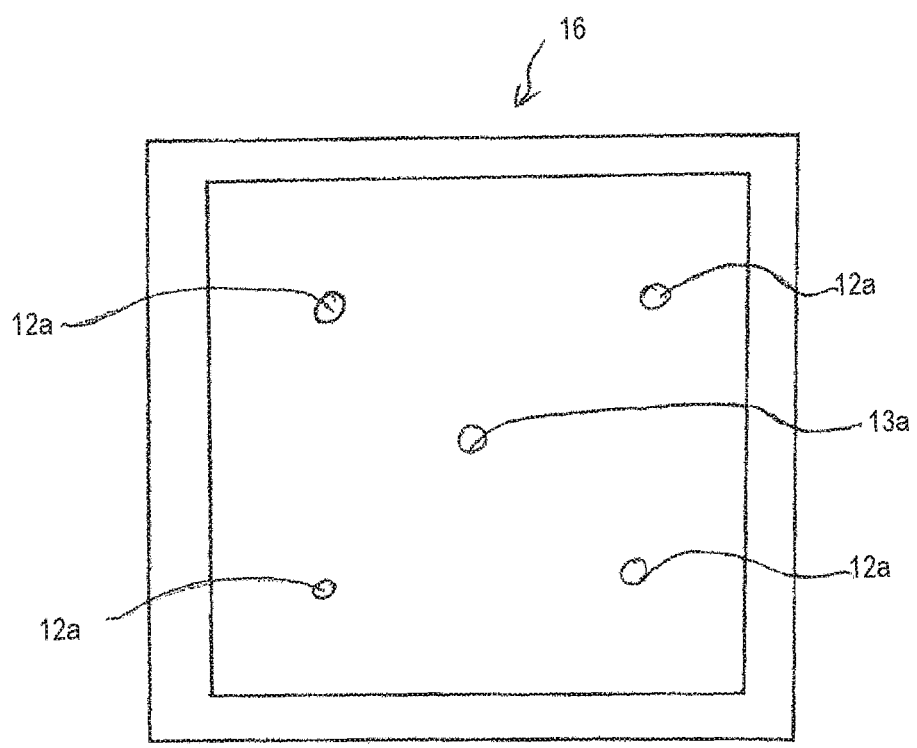
FIG. 3 shows the cover plate.

In addition, the repair device optionally comprises a cover plate 16, which is shown in detail in FIG. 3. The cover plate 16 is introduced into the space 14 between container wall 4 and repair die 10 before the repair procedure. The cover plate 16 also has at least one injection opening, in this case four injection openings 12a, and at least one outlet opening 13a. The cover plate also in this case has a square surface area. The arrangement of the injection openings 12a and of the outlet opening 13a corresponds to the arrangement of the injection openings 12 and outlet opening 13 in the repair die 10. The outlet opening 13a is located centrally at the mid-point of the square surface area, while the injection openings 12a are located out from and around the outlet opening 13a.

A reservoir 17 for an adhesive 18 is also arranged on the carrier 6. Moreover, a remotely controllable injection device 20 is arranged on the carrier 6 for the purpose of injecting adhesive 18 from the reservoir 17 into the injection openings 12 of the repair die 10 and the injection openings 12a of the repair die, such that the space 14 formed by the repair die 10 or the cover plate 16 and container wall 4 can be filled by means of the adhesive 18.

The reservoir 17 comprises a chamber for each component of a multi-component adhesive 18, i.e. in this case two chambers 17a, 17b. A mixing device 22, with which the individual components of the adhesive 18 can be mixed, is moreover arranged on the carrier 6.

Figure 4:
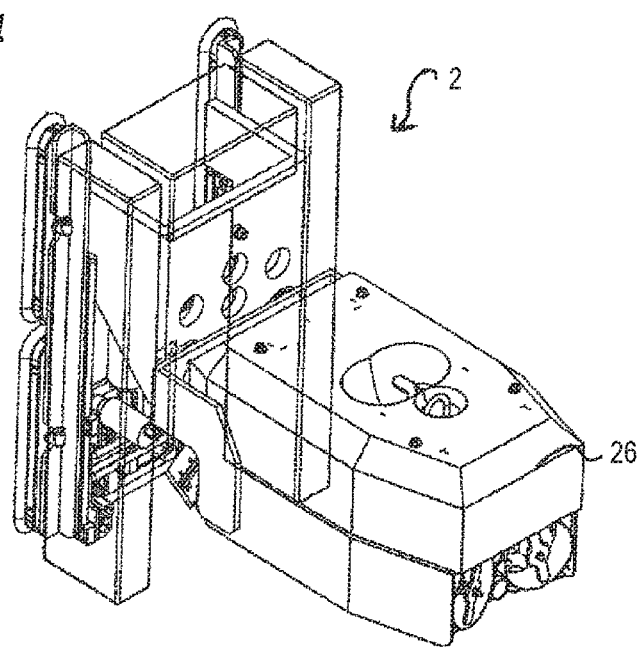
FIG. 4 shows a perspective view of the repair device with a submersible vehicle.
Figure 5:
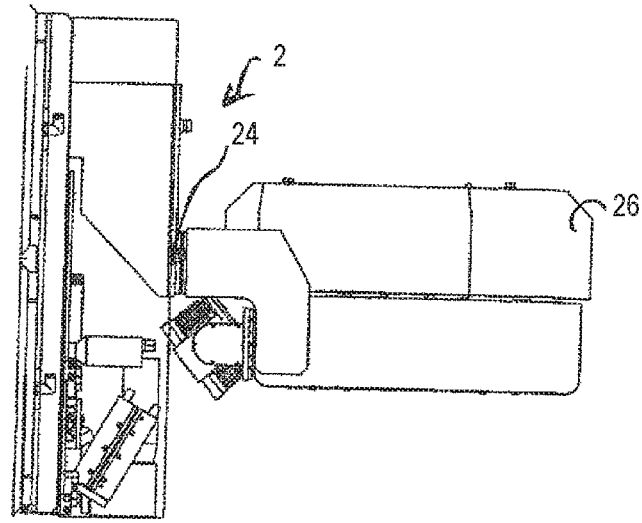
FIG. 5 shows a side view of the repair device with a submersible vehicle.
Figure 6:
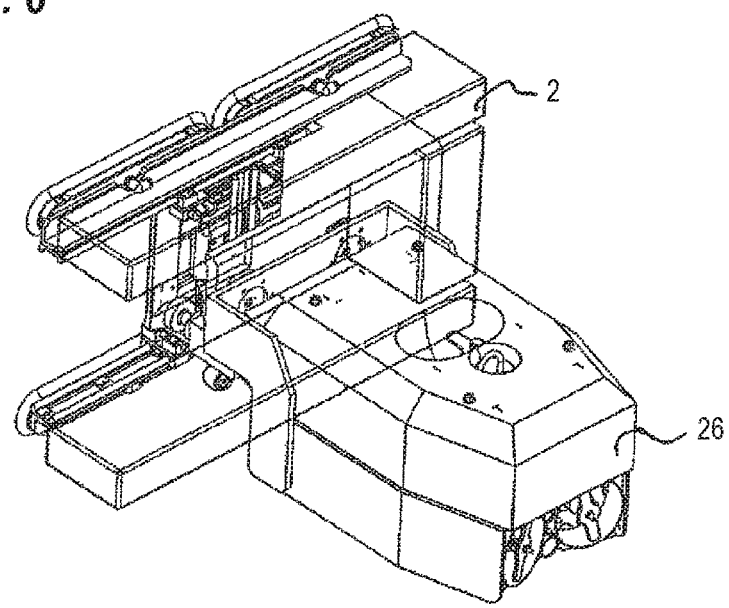
FIG. 6 shows a perspective view of the repair device with a submersible.
Figure 7:
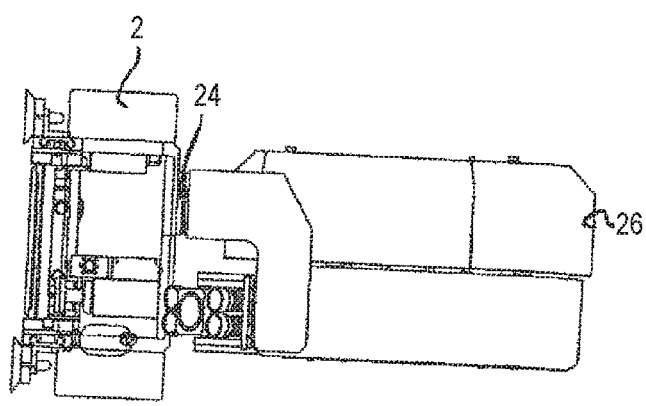
FIG. 7 shows a side view of the repair device with a submersible vehicle.

To permit maneuverability of the repair device 2 according to the invention in water, it has a coupling 24 with which the repair device 2 can be connected to a positioning device 26. In particular, the positioning device 26 can be a remotely controllable submersible vehicle, as is shown in FIGS. 4 to 7. The coupling 24 is configured in such a way as to permit several options for arranging repair device 2 and positioning device 26. In FIGS. 4 and 5, the repair device 2 is arranged in a vertical direction with respect to the positioning device 26, whereas in FIGS. 6 and 7 the repair device 2 is oriented horizontally with respect to the positioning device 26. This permits a greatly variable use of the repair device 2 in different positions and areas of a container wall 4.

Figure 8:
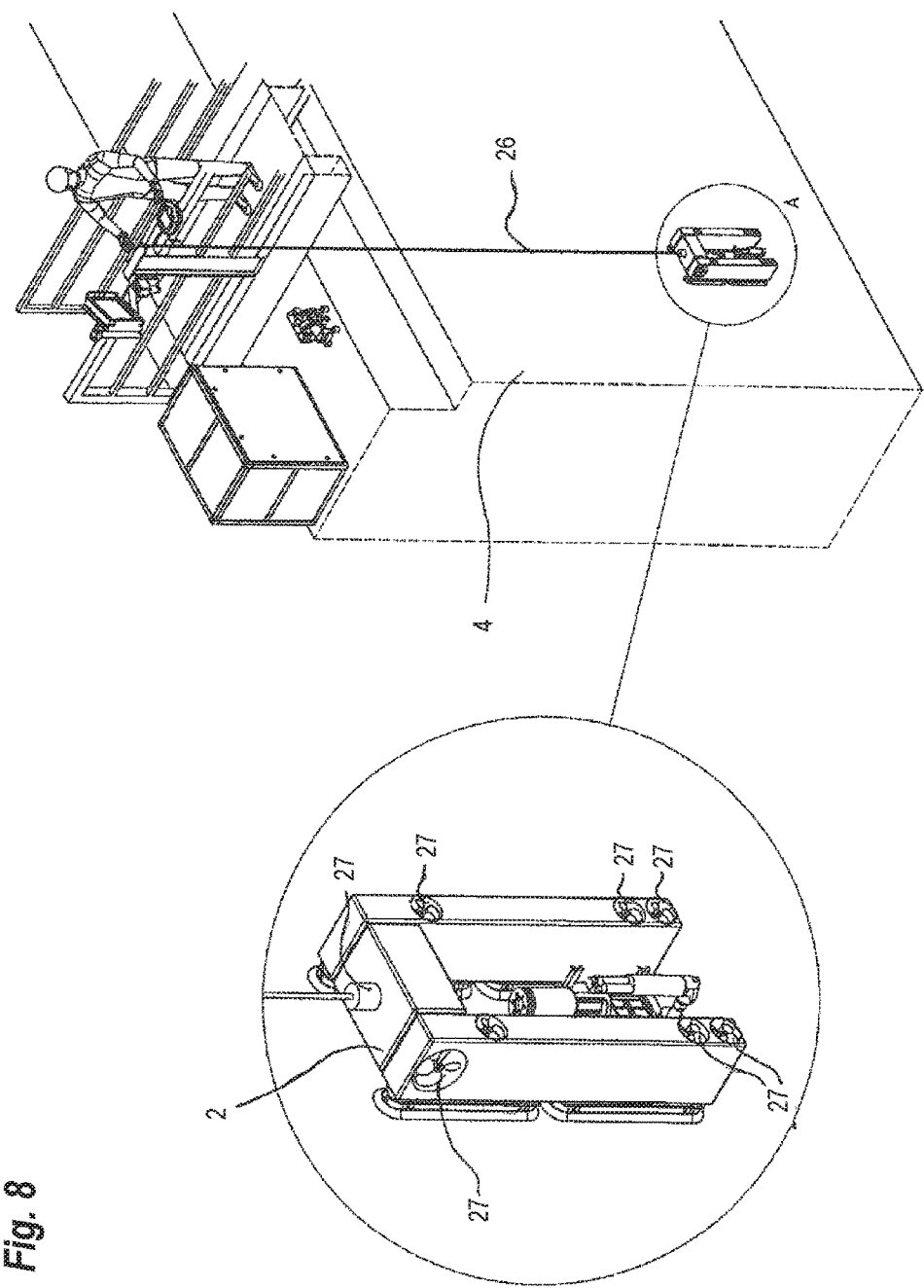
FIG. 8 shows the repair device with a linkage system or cable pull.

A further embodiment of a positioning device 26 is shown in FIG. 8. It is in this case formed by a linkage system and/or a cable pull. The positioning device 26 is also connected here to the repair device 2 by a coupling 24. For the positioning, the device 2 can also be provided with its own drives 27 in addition to the positioning device 26. With the aid of the linkage system and the drives 27, a remotely controlled movement of the repair device 2 is then ensured and, therefore, a positioning on the container wall 4.

Figure 9:
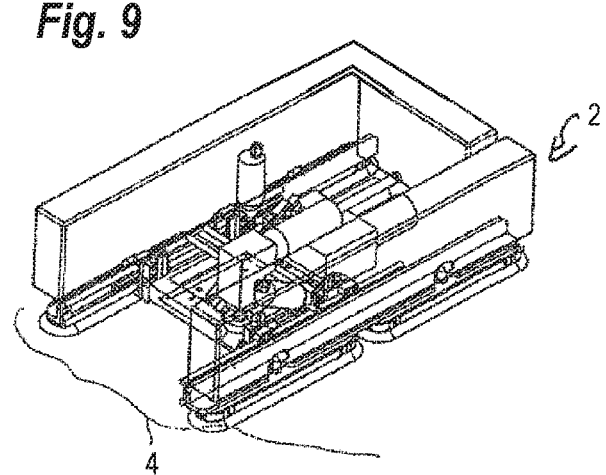
FIGS. 9 to 12 show the repair device in different situations during a repair procedure.

FIG. 9 now shows a situation in which the device 2 is secured to the container wall 4 by means of the securing means 8, i.e. the suction pads. After the device 2 was secured to the container wall 4, the positioning device 26 was uncoupled from the repair device 2.

Figure 10:
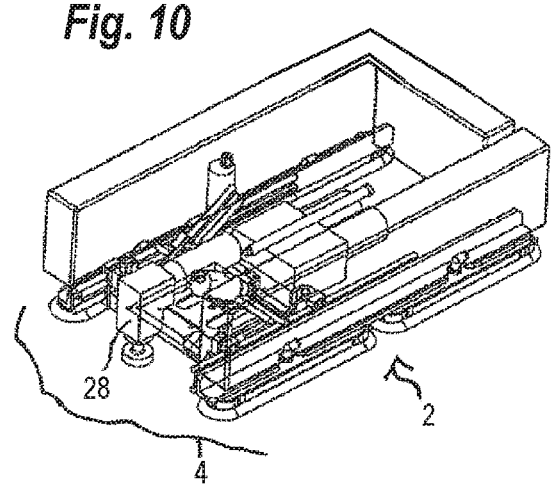

Thereafter, as is shown in FIG. 10, the basis surface of the damaged area of the container wall 4 is cleaned by means of a cleaning device 28 arranged on the repair device 2.

Figure 11:
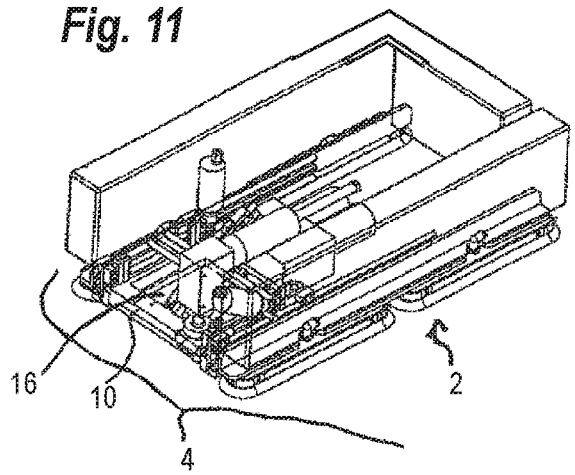

Finally, the repair die 10 is positioned together with the cover plate 16 over the damaged area, as can be seen in FIG. 11. The repair die 10 fully covers the damaged area circumferentially and forms a space 14, which defines a cavity between the repair die and container wall.

Figure 12:
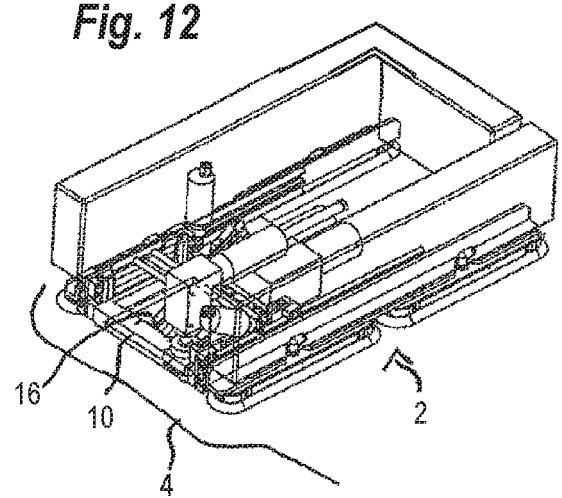

As is shown in FIG. 12, injection of the adhesive 18 from the two chambers 17a, 17b of the reservoir 17 into the injection openings 12 of the repair die 10 and the injection openings 12a of the cover plate 16 then takes place in a remotely controlled manner by means of the injection device 20. The water located in the space 14 is displaced by the incoming adhesive 18 and escapes from the space 14 through the outlet opening 13, 13a. The space 14 is thus gradually filled completely with adhesive 18. The excess adhesive 18 is collected in a collecting chamber. Thereafter, the injection device 20 is moved parallel to the repair die 10. The injection openings 12 and the outlet opening 13 are completely closed for the setting process. After this setting, the damaged area is repaired.

The repair die 10 is finally removed from the damaged area, and the repair device 2 is released from the container wall 4 by release of the means 8. By contrast, the cover plate 16 remains adhering to the affixed adhesive 18 and, after the repair process, protects the latter from mechanical damage for example, such that there is a permanent repair of the damaged area.

Figure 13:
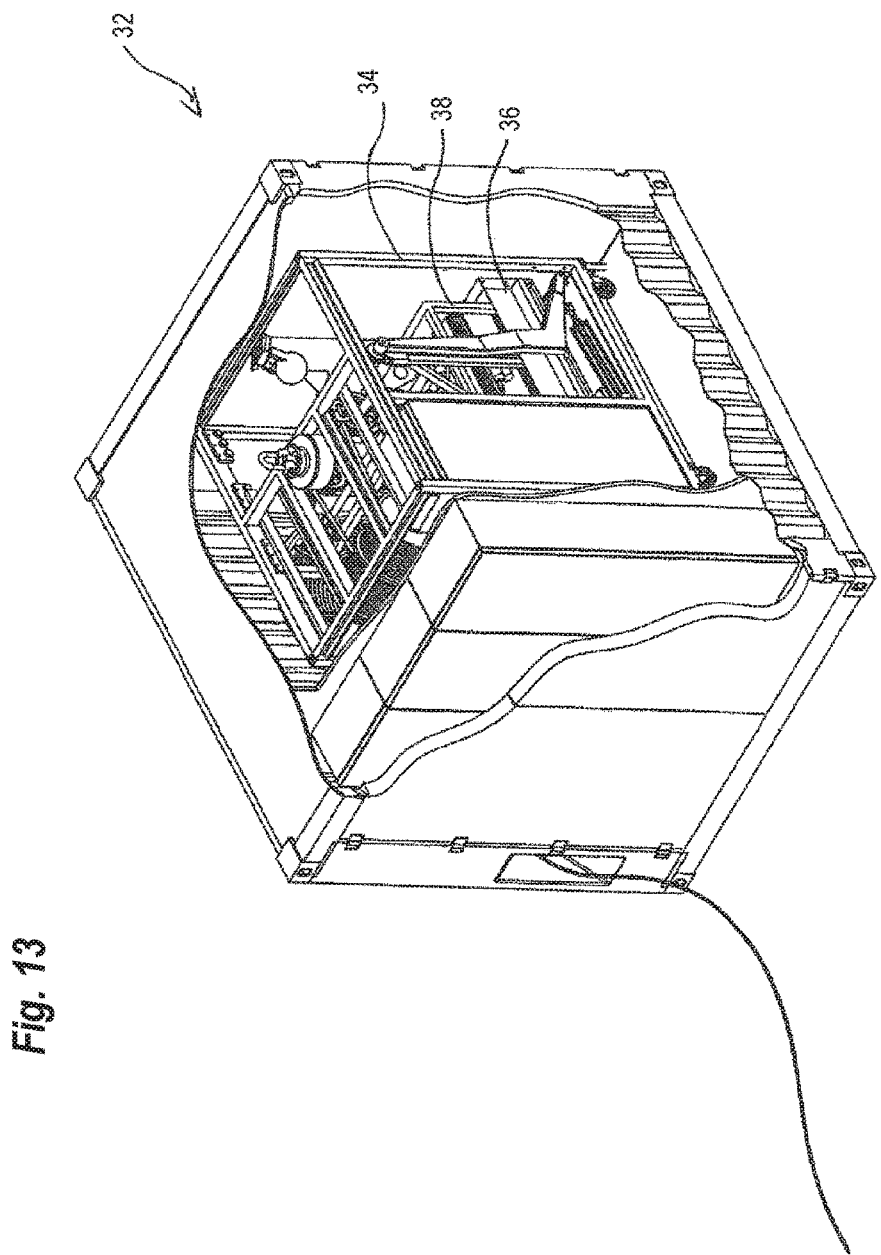
FIG. 13 shows a crate with a frame.

FIG. 13 shows a crate 32 in which a frame 34 is located. Moreover, a decontamination device 36 and a transport vessel 38 for the repair device 2 described above and shown again in FIGS. 16 and 17 are arranged inside the frame 34.

The method is now characterized in particular in that, in a first step a), the crate 32 is placed, along with the abovementioned components, in the vicinity of the site of use. It can be placed in this way, for example, by means of a low-loader and a truck crane.

Figure 14:
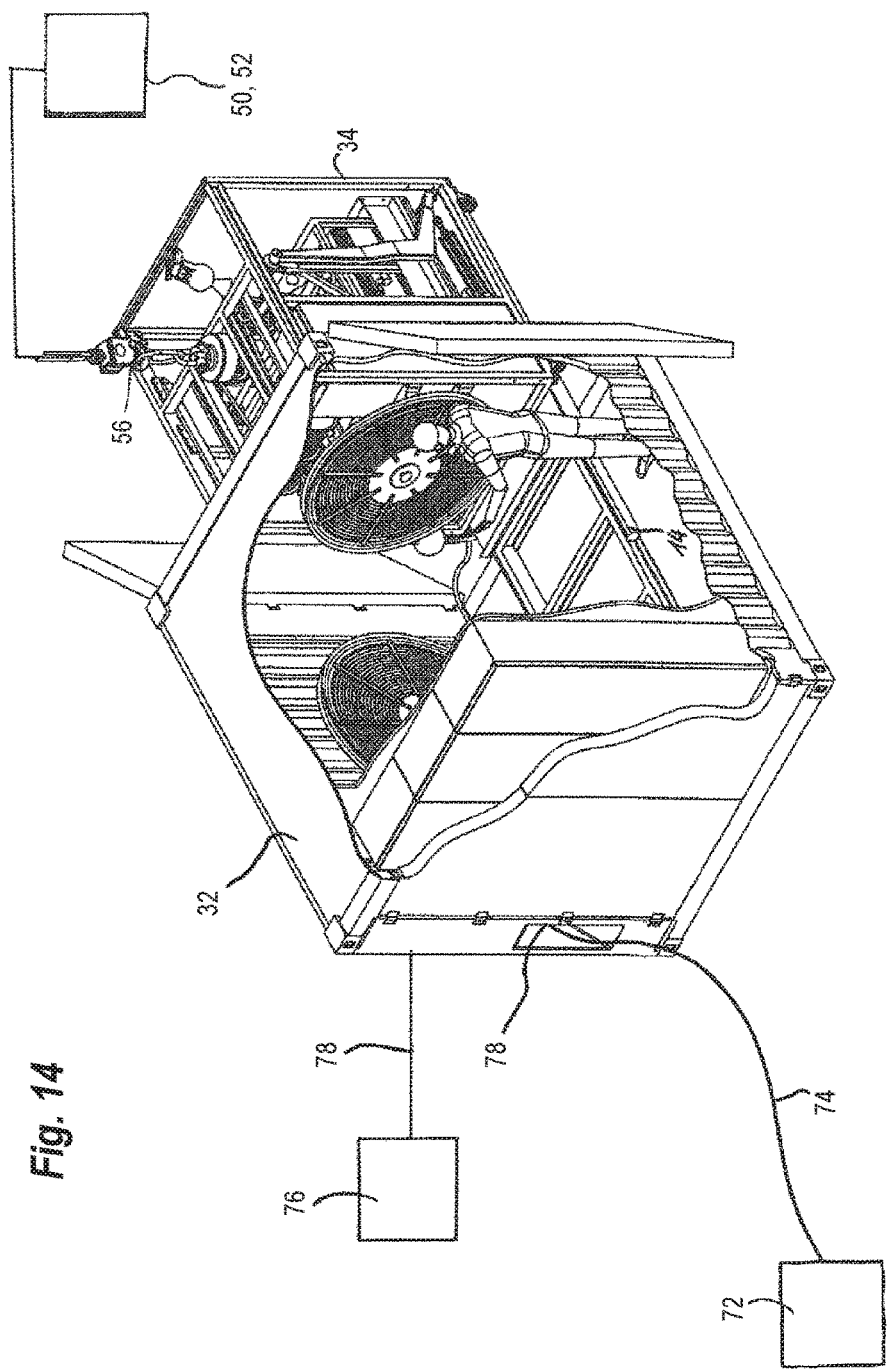
FIG. 14 shows a crate with the frame driven out.

In a further step b), the frame 34 is unloaded from the crate 32. Such a situation is shown in detail in FIG. 14. As can be seen in FIG. 14, the frame 34 was unloaded from the crate 32 by means of the transport rails 44.

Figure 15:
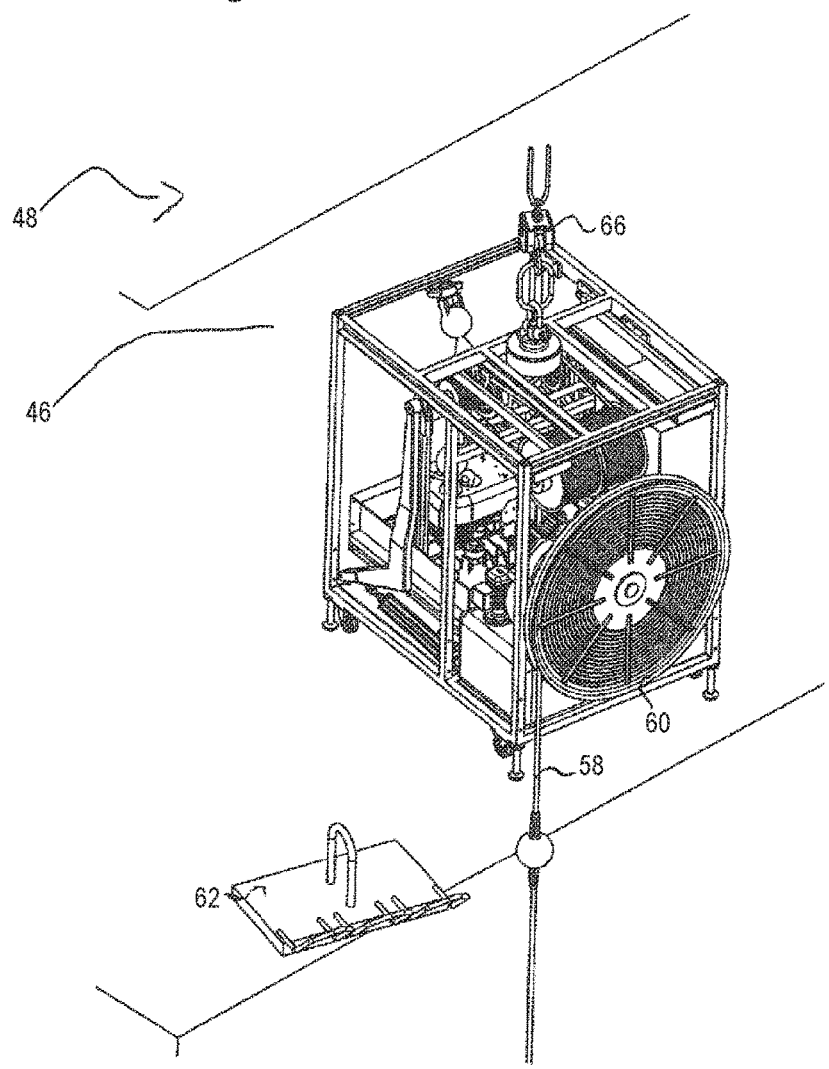
FIG. 15 shows the frame during a transport situation.
Figure 17:
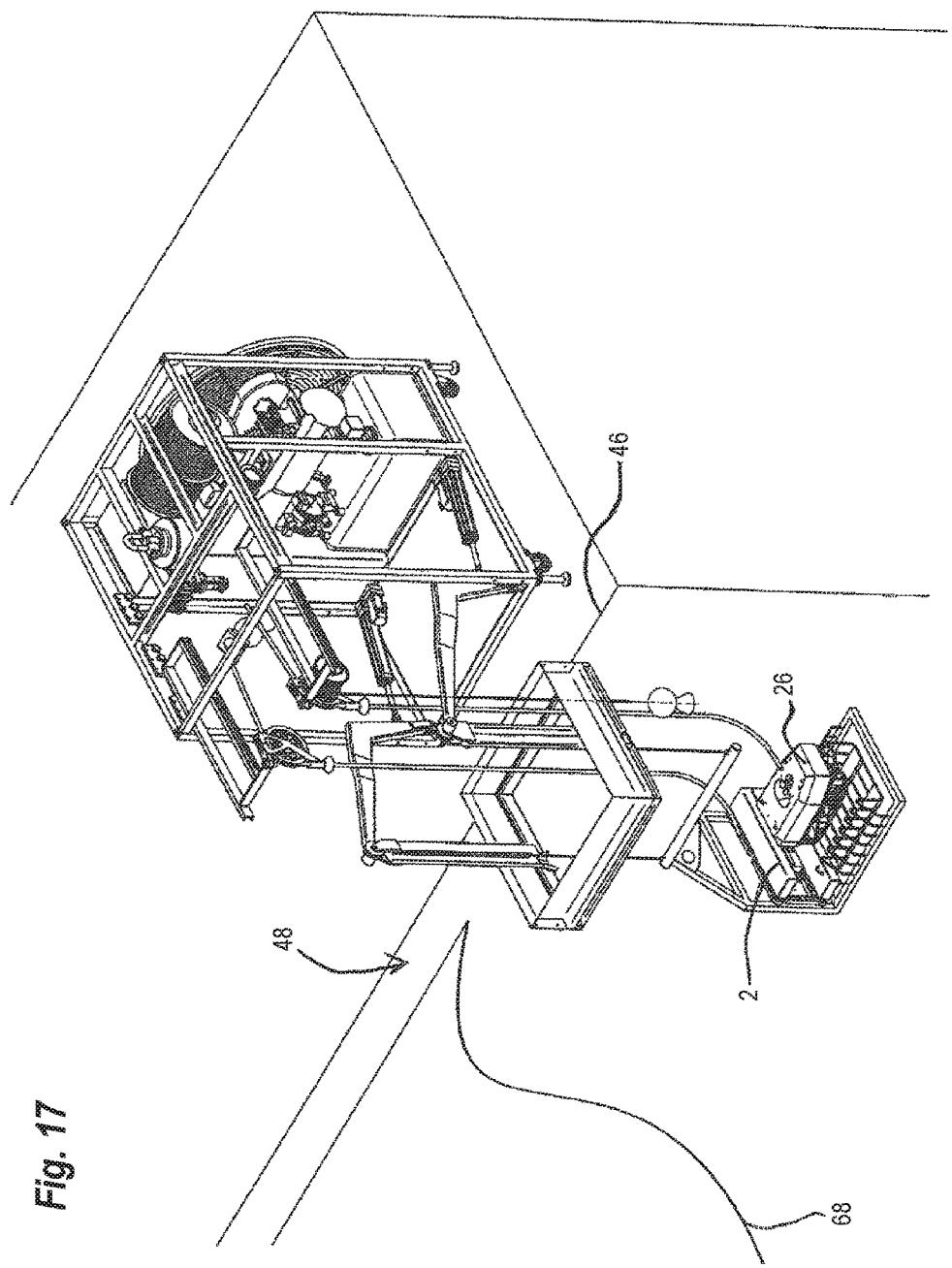
FIG. 17 shows the frame with the decontamination device driven out and the transport vessel located therein.

Thereafter, as per step c), the frame 34 is placed on the edge 46 of the container 48 shown in FIGS. 15 and 17. This is done with the aid of a lifting device 50 which, in the illustrative embodiment, is formed by a crane 52. To permit lifting of the frame 34, a lug 54 is fitted on the latter, in which lug 54 a preferably remotely controlled crane hook 56 is suspended.

FIG. 15 now shows a situation in which the frame 34 is suspended freely on the crane hook 56 and is moved in the direction of the edge 46 of the container 48. To supply the repair device 2 subsequently with power and to permit remote operation, a supply line 58 is mounted on the frame 34, which supply line 58 is rolled up on a drum 60 likewise arranged on the frame 34. During the transport of the frame to the desired location on the edge 46 of the container 48, the supply line 58 is unrolled from the drum 60 such that a connection of the frame 34 to the crate 32 is still ensured. In order to fix and stabilize the supply line 58 over long distances, it can be suspended in a fixing device 62 as in the illustrative embodiment.

Figure 16:
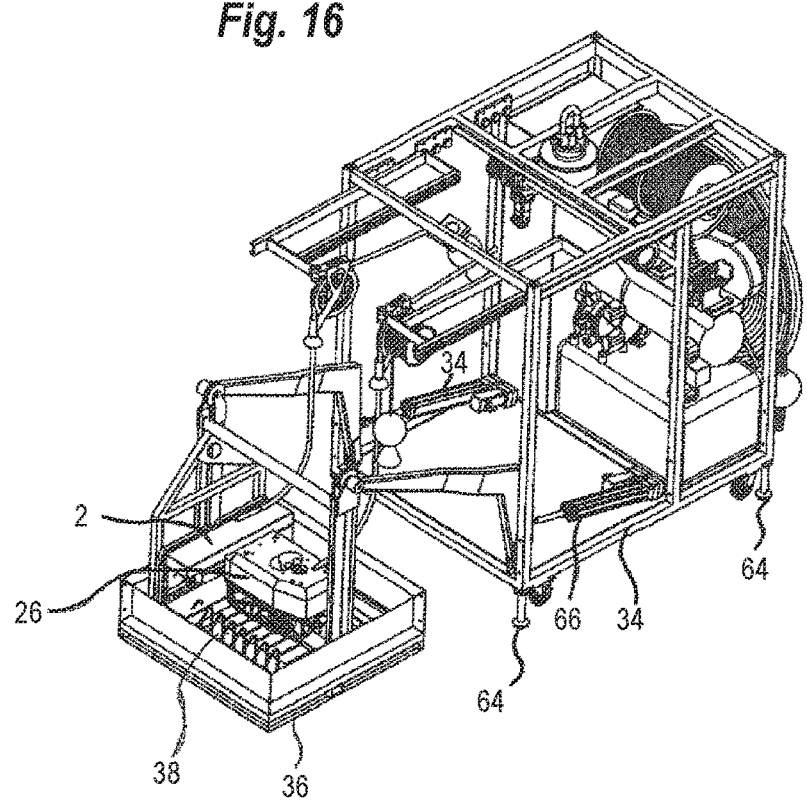
FIG. 16 shows a frame placed on the edge of a container, with the decontamination device and transport vessel driven out.

FIG. 16 now shows a situation in which the frame 34 is located when it is placed on the edge 46 of the container 48. The frame 34 is fixed at this location by feet 64 so that it cannot roll away.

In step d) of the method, the decontamination device 36 is then driven out of the frame 34, along with the transport vessel 38, with the aid of the movement of lifting cylinders 66, such that the decontamination device 36 and the transport vessel 38 are located above the water level 68 shown in FIG. 17.

As is shown in FIG. 17, the transport vessel 38, with the repair device 2 coupled to the positioning device 26, is then lowered into the container 48 filled with water. The positioning device 26 is formed by a submersible vehicle.

Steps c) to e) and the control of the repair device 2 and also of the positioning device 26 are effected remotely. For this purpose, the crate 32 comprises switch cabinets with a communication interface 70 via which, on the one hand, a switching center 72 is connected by means of a cable 74 to an optical waveguide, for example, and, on the other hand, the supply line 58 is connected. By way of this connection, control commands can then be made at a safe distance from the direction of the switching center 72 and can reach the individual remotely controllable components. In particular, by means of the switching center 72, it is thus possible for the decontamination device 36 and the transport vessel 38 to be driven out of the frame, such that the decontamination device 36 and the transport vessel 38 are located above the water level and, finally, the transport vessel 38 and the repair device 2 are lowered into the container 48 filled with water. Moreover, further remote control of the positioning device 26 and of the repair device 2 and thus of the repair process can take place via this connection and from the switching center. It is thus possible for the repair device 2 to be positioned and used at a location that is inaccessible to operating personnel.

Alternatively, the connection of the switching center to the communication interface 70 can also be effected wirelessly using a radio connection. It is thus unnecessary to lay cables.

The individual components can be supplied with power via an external power supply unit 76, which is connected to the crate 32 by means of a cable 78.

After completion of a repair procedure, the repair device 2 and the positioning device 26 can be decontaminated with the aid of the decontamination device 36, for example by a physical cleaning method.

The invention claimed is:

1. A repair device for repairing damage to a container wall located under water comprising;
   a carrier including means for securing the carrier to the container wall,
   a repair die being arranged on the carrier, said repair die having at least one injection opening and at least one outlet opening, the repair die being adapted to be pressed against the container wall in a remotely controlled manner in order to cover the damage to the container wall and to seal off a space between the repair die and container wall,
   a reservoir for an adhesive being arranged on the carrier,
   a remotely controllable injection device being arranged on the carrier, which remotely controllable injection device is provided in order to inject adhesive from the reservoir into the injection opening of the repair die, such that the space formed by the repair die and container wall is filled by means of the adhesive, and
   a cover plate located in the space between the repair die and the container wall before the repair process, adhered to the adhesive during the repair process, and protects the adhesive after the repair process.

2. The repair device according to claim 1, wherein the repair device further comprises a coupling adapted to connect the repair device to a positioning device.

3. The repair device according to claim 2, wherein the coupling is adapted to connect the repair device to a remotely controllable submersible vehicle.

4. The repair device according to claim 1, further comprising a cleaning device.

5. The repair device according to claim 1, wherein the means for securing the repair device to the container wall comprise suction pads.

6. The repair device according to claim 1, wherein the repair die has several injection openings.

7. The repair device according to claim 1, wherein the reservoir comprises several chambers for each component of a multi-component adhesive, and the carrier comprises a mixing device for mixing the individual components.

8. A method for repairing damage to a container wall located under water, using a repair device, the method comprising,
   securing a carrier of the repair device to the container wall,
   remotely controlling the repair device in order to press a repair die against the container wall such that the repair die covers the damage of the container wall and seals off a space between the repair die and the container wall, wherein the repair die is arranged on the carrier and includes at least one injection opening and at least one outlet opening, remotely controlling an injection device of the repair device in order to inject an adhesive from a reservoir into the injection opening of the repair die, such that the space formed by the repair die and the container wall is filled by means of the adhesive, wherein the reservoir and the injection device are arranged on the carrier, and arranging a cover plate such that it is located in the space between the repair die and the container wall before the injecting of the adhesive, adhering the cover plate to the adhesive during the injecting of the adhesive, and protecting the adhesive after the injecting of the adhesive using the cover plate.

9. The method as claimed in claim 8, wherein the repair device is positioned to repair the damage to the container wall located under water, and the positioning of the repair device further comprises the following steps:

a) providing a crate in which a frame with a hoisting device is located, said crate including a decontamination device and a transport vessel with the repair device according to one of the preceding claims being arranged within the frame, b) unloading the frame from the crate, c) placing the frame on the edge of the container, d) driving the decontamination device and the transport vessel out of the frame, such that the decontamination device and the transport vessel are located above the water level, and e) lowering the transport vessel with the repair device into the container filled with water.

10. The method according to claim 9, wherein the frame in step c) is placed on the edge of the container by means of a lifting device.

11. The method according to claim 10, wherein a crane is used as lifting device.

12. The method according claim 9, wherein remote operation of steps c) to e) is effected via a communication interface that is present on the crate.

13. The method according to claim 12, wherein a wireless connection to a switching center is produced via the communication interface.

14. The method according to claim 9, wherein the repair device, after step e), is maneuvered in the water in a remotely controlled manner by means of a positioning device.

15. The method according to claim 8, wherein a base of a damaged area of the container wall is cleaned by means of a cleaning device of the repair device.

16. The method according to claim 8, wherein the repair device is secured to the container wall by means of suction pads.

* * * * *